(12) United States Patent
Shima et al.

(10) Patent No.: US 6,338,449 B1
(45) Date of Patent: Jan. 15, 2002

(54) TAPE CASSETTE CAPABLE OF EASILY INSTALLING AND SECURING BIASING MEMBER FOR REEL BRAKE

(75) Inventors: Motohiko Shima; Hiroshi Kaneda, both of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/455,378

(22) Filed: Dec. 6, 1999

(30) Foreign Application Priority Data

Dec. 8, 1998 (JP) .......................................... 10-348647

(51) Int. Cl.⁷ ...................... G11B 23/087; G11B 23/04
(52) U.S. Cl. .................... 242/343.2; 242/343; 242/347; 242/347.2; 360/132
(58) Field of Search .............................. 242/343, 343.2, 242/347, 347.2; 360/132

(56) References Cited

U.S. PATENT DOCUMENTS

| | | | |
|---|---|---|---|
| 4,553,717 A | * 11/1985 | Takagi | 360/132 X |
| 4,579,295 A | * 4/1986 | Harada | 360/132 X |
| 5,255,144 A | * 10/1993 | Iwahashi et al. | 360/132 |
| 5,449,124 A | * 9/1995 | Fujii | 242/343.2 X |
| 5,506,739 A | * 4/1996 | Iwahashi | 360/132 |
| 5,860,611 A | * 1/1999 | Ikebe et al. | 242/343 |
| 5,873,537 A | * 2/1999 | Yamada et al. | 242/343.2 |
| 5,899,400 A | * 5/1999 | Yamada et al. | 242/343.2 |

FOREIGN PATENT DOCUMENTS

| | | |
|---|---|---|
| DE | 196 06 407 | 8/1996 |
| DE | 196 13 408 | 10/1996 |
| EP | 0 169 514 | 1/1986 |
| EP | 0 580 355 | 1/1994 |
| JP | 5-019897 | 5/1993 |
| WO | WO 88/03312 | 5/1988 |
| WO | WO 95/31810 | 11/1995 |

* cited by examiner

*Primary Examiner*—Donald P. Walsh
*Assistant Examiner*—Minh-Chau Pham
(74) *Attorney, Agent, or Firm*—Oblon, Spivak, McClelland, Maier & Neustadt, P.C.

(57) ABSTRACT

A tape cassette including a case body having upper and lower cases each having partition walls configured to rotatably receive tape reels wound with a tape-shaped medium, a reel brake configured to engage with the tape reels to prevent a free rotation when the tape cassette is not in use and slide between locked and unlocked positions of the tape reels, a biasing member configured to urge the reel brake toward the tape reels, and a support portion for supporting the biasing member provided outside the partition walls of the lower case, wherein one of the partition walls of the lower case has a cut-out portion adjacent to the support portion, and one of the partition walls of the upper case has a projected portion configured to engage with the cut-out portion of the lower case when the upper and lower cases are connected.

2 Claims, 4 Drawing Sheets

TAPE CASSETTE CAPABLE OF EASILY INSTALLING AND SECURING BIASING MEMBER FOR REEL BRAKE

CROSS REFERENCE TO RELATED APPLICATION

The present application claims priority to Japanese patent application No. 10-348647, filed Dec. 8, 1998.

BACKGROUND OF THE INVENTION

This invention relates to a tape cassette, and more particularly to a small-sized tape cassette such as DVC (Digital Video Cassette) or the like.

A conventional tape cassette is disclosed, for example, in Japanese Utility Model Publication 5-19897(U). The tape cassette of this type comprises a case body consisting of an upper case and a lower case for containing rotatably therein a pair of tape reels which are wound with a tape. The lower case is provided with partition walls for defining areas for the tape reels, and the tape reels are respectively positioned in the areas surrounded with the partition walls.

Also inside the case body, is slidably provided a reel brake which is adapted to engage with the tape reels. The reel brake is biased toward the tape reels by means of a spring (biasing member). A support shaft to which the spring is fitted is provided outside and close to one of the partition walls of the lower case. The reel brake is engaged with the tape reels by a spring force of the spring while the tape cassette is not in use (the tape reels are locked) to prevent a free rotation of the tape reels. On the other hand, when the tape cassette is in use, the reel brake is caused to slide against the spring force of the spring thereby to disengage the tape reels from the reel brake.

However, in the above described conventional tape cassette, especially in the small-sized DVC or the like, the support shaft for supporting the spring is positioned close to the partition wall. Therefore, when the spring is mounted on the support shaft by means of an automatic assembling machine, an assembling error is likely to happen, or in some cases, a tool of the assembling machine abuts on the partition wall, thus causing a damage to the partition wall. This will lead to a problem of a low productivity of the tape cassette.

There has been an additional problem that when a vibration or a shock is exerted to the tape cassette while it is assembled or used, an arm portion of the spring is disengaged from a back face of a main body of the reel brake, and accordingly, a function of the reel brake will be lost.

SUMMARY OF THE INVENTION

Therefore, it is an object of the present invention to provide a tape cassette, especially a small-sized tape cassette in which the biasing member of the reel brake can be assembled near the partition wall without interfering with a part of the tape cassette and the tool of the assembling machine, and in which also the biasing member and the reel brake may not be disengaged from each other.

In order to solve the above described problems, there is provided according to an invention, a tape cassette which comprises a case body consisting of an upper case and a lower case, and including partition walls for defining areas for tape reels which are wound with a tape-shaped medium to rotatably contain the tape reels, a reel brake for preventing a free rotation of the tape reels in engagement with the tape reels when the tape cassette is not in use, the reel brake being biased toward the tape reels by means of a biasing member and slidably arranged between a locked position and an unlocked position of the tape reels, and a support portion for supporting the biasing member provided outside and close to the partition walls of the lower case, characterized in that a cut-out is formed in one of the partition walls of the lower case near the support portion, which is partially lower in height, and a projection is formed in one of the partition walls of the upper case at a position confronting the cut-out of the lower case, both the cut-out in the lower case and the projection in the upper case engaging with each other when the upper case and the lower case is connected.

The partition wall near the support portion for supporting the biasing member is made lower in a form of a cut-out. This will prevent the interference of the tool of the automatic assembling machine with the partition wall, when the biasing member is mounted by means of the automatic assembling machine. Further, the cut-out of the partition wall of the lower case and the projection of the partition wall of the upper case engage with each other, after assembled, and the tape reels are securely partitioned by means of the partition walls of the upper case and the lower case.

Further, according to an invention, there is provided a tape cassette which comprises a case body consisting of an upper case and a lower case for rotatably containing tape reels which are wound with a tape-shaped medium, and a reel brake for preventing a free rotation of the tape reels in engagement with the tape reels when the tape cassette is not in use, the reel brake being biased toward the tape reels by means of a helical torsion coil spring and slidably arranged between a locked position and an unlocked position of the tape reels, characterized in that a winding portion of the helical torsion coil spring is inserted into a support shaft in the lower case, with one of its arms abutted on a back face of a main body of the reel brake and the other arm abutted on the lower case respectively, the back face of the main body of the reel brake being formed with a protrusion for preventing disengagement of the one arm of the helical torsion coil spring therefrom.

When one of the arms of the helical torsion coil spring abuts on the back face of the main body of the reel brake, the movement of the arm will be restricted by the projection provided at the back face of the main body. This will prevent the one arm of the helical torsion coil spring from disengaging from the reel brake.

BRIEF DESCRIPTION OF THE PREFERRED EMBODIMENTS

DETAILED DESCRIPTION OF THE PREFERRED EMBODIMENTS

Figure 1:
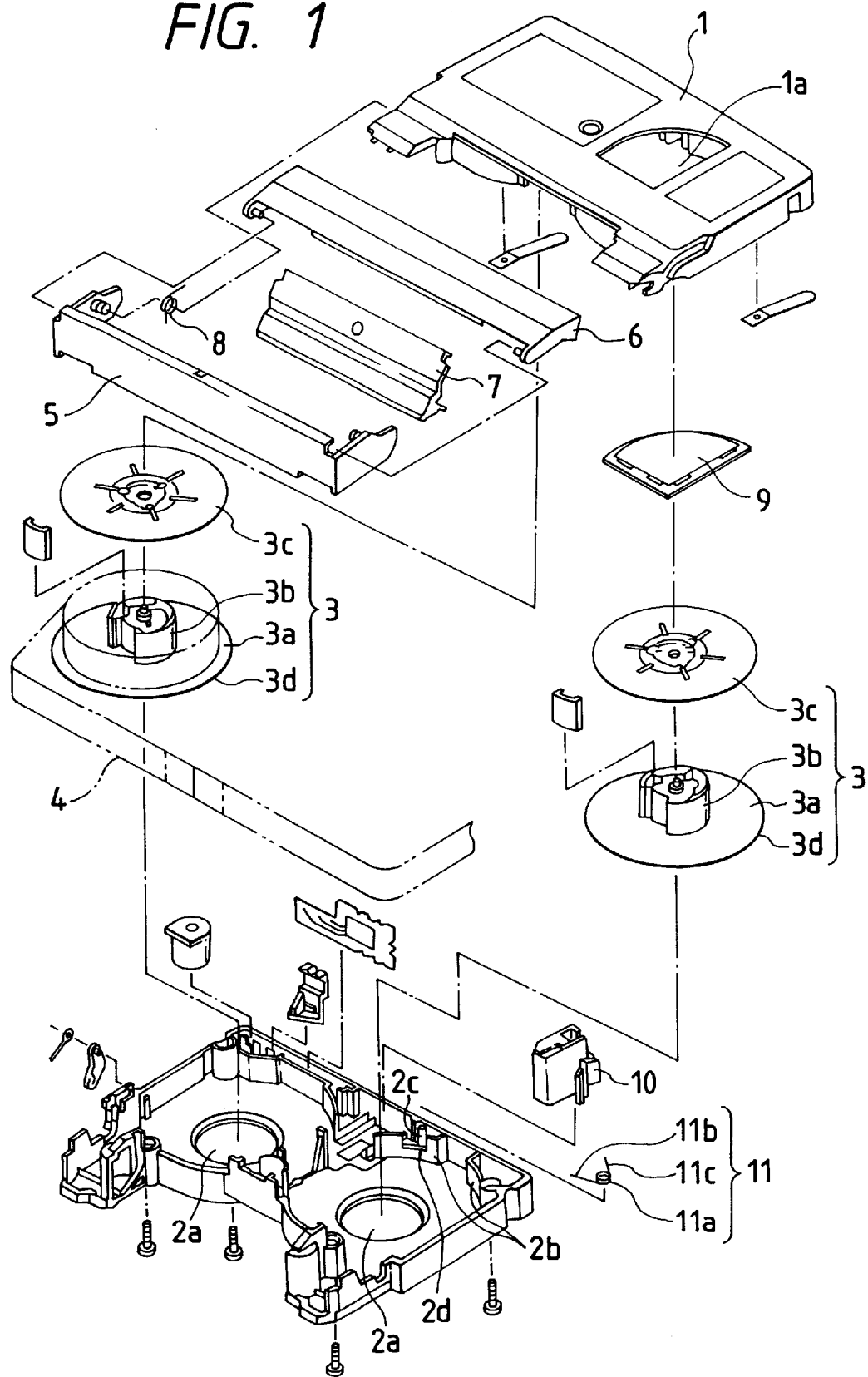
FIG. 1 is an exploded perspective view showing one embodiment of a tape cassette according to the invention.

Now, referring to the drawings, an embodiment of the present invention will be described. FIG. 1 is an exploded perspective view showing one embodiment of a tape cassette (DVC) according to the invention.

A case body consists of an upper case 1 and a lower case 2. A pair of tape reels 3 wound with a tape-shaped medium (magnetic tape) 4 for recording information are rotatably contained inside the case body. At an inner wall of the upper case 1 is attached a spring which presses the tape reels 3 downward.

The tape reel 3 consists of a lower flange 3a, a hub portion 3b integrally formed with the lower flange 3a, and a transparent upper flange 3c fixed to an upper face of the hub portion 3b by welding, etc. The tape-shaped medium 4 is so arranged as to come out from one end of the front face of the lower case 2, passing in front of the lower case 2, and return to an interior of the case body from the other end of the front face of the lower case 2.

To the front face of the upper case 1, is fitted a front lid 5, an upper lid 6 and a back lid 7 which compose an L-shape and can open and close the front face of the case body. The front lid 5 is rotatably attached to the upper case 1 and is kept closed by means of a spring 8. The upper lid 6 is fitted to the front lid 5, and the back lid 7 is fitted to the upper lid 6 respectively.

When the tape cassette is not in use, these front lid 5, upper lid 6 and back lid 7 cover and protect the tape-shaped medium 4 which passes in front of the lower case 2. On the other hand, when the tape cassette is in use, the front lid 5 is rotated and moved above the upper case 1, and in association with this movement of the front lid 5, the upper lid 6 and the back lid 7 are retracted to a determined position thereby to expose the tape-shaped medium 4 which is positioned in front of the lower case 2.

A reel brake 10 is arranged in the lower case 2 at a backward portion of the central part thereof so as to slide toward the tape reels 3. The reel brake 10 is biased toward the tape reel 3 by a spring 11 which is a biasing member (helical torsion coil spring). The reel brake 10 slidably moves along a guide groove formed in the lower case 2 with its part to be guided engaged with the guide groove.

The lower flange 3a of the tape reel 3 is provided with teeth 3d at its outer periphery. When the tape cassette is not in use, a tip end of a hook of the reel brake 10 enters between the teeth 3d of the lower flange 3a to lock the tape reel 3 in order to prevent a free rotation of the tape reel 3.

On the other hand, when the tape cassette is in use, the reel brake 10 is moved away from the tape reel 3 against the biasing force of the spring 11 to release the engagement with the teeth 3d of the lower flange 3a, thereby to put the tape reel 3 into a position where it can rotate.

The upper case 1 is formed with an opening 1a of a sector shape, and to an inner face of the upper case 1 at an area including the opening 1a is fixed by welding or the like a plate-like window member 9 formed of a transparent resin. A remaining amount of the tape-shaped medium 4 can be visually confirmed by means of the window member 9 through the transparent upper flange 3c.

Figure 2:
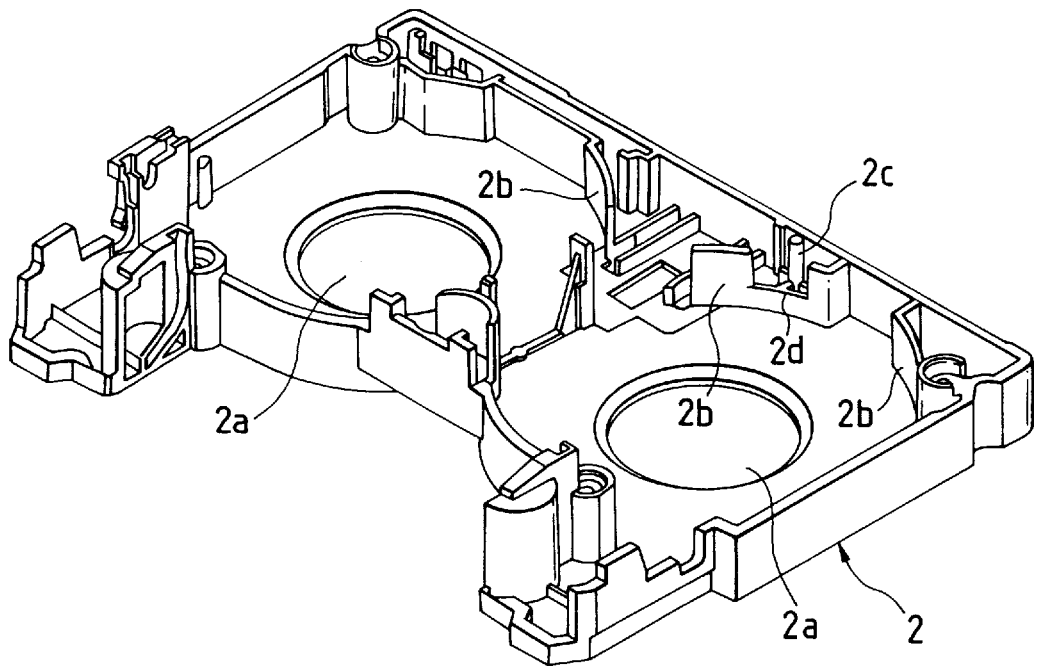
FIG. 2 is a perspective view showing an interior of the lower case more particularly.

FIG. 2 is a perspective view showing more particularly an interior of the lower case 2. At the inner wall of the lower case 2 are formed with openings 2a into which driving shafts of the recording and reproducing apparatus are inserted. Each of the tape reels 3 is positioned in the lower case 2 so that the center of the opening 2a coincides with the center of the tape reel 3, with an annular rib (not shown) formed at a bottom of the lower flange 3a of the tape reel 3 inserted into the opening 2a.

In addition, the lower case 2 is provided with partition walls 2b for defining the areas for the tape reels 3. Outside and close to one of the partition walls 2b, is formed a support portion (support shaft) 2c for supporting the spring 11 for biasing the reel brake 10 toward the tape reels 3. By inserting a winding portion 1a of the spring 11 into the support portion 2c, the spring 11 is attached to the lower case 2.

In the partition wall 2b near a position where the support portion 2c is provided, is formed a cut-out 2d which is a part of the partition wall 2b having a lower height. The cut-out 2d makes a relief when the spring 11 is clamped by the automatic assembling machine and the winding portion 11a of the spring 11 is inserted into the support portion 2c of the lower case 2. Therefore, a part of the automatic assembling machine clamping the spring 11 will not interfere with the partition wall 2b.

As the assembling steps into the lower case 2, the spring 11 is mounted, after the reel brake 10 has been attached first. Then, the tape reels 3 which have been wound with the tape-shaped medium 4 are incorporated.

Figure 3:
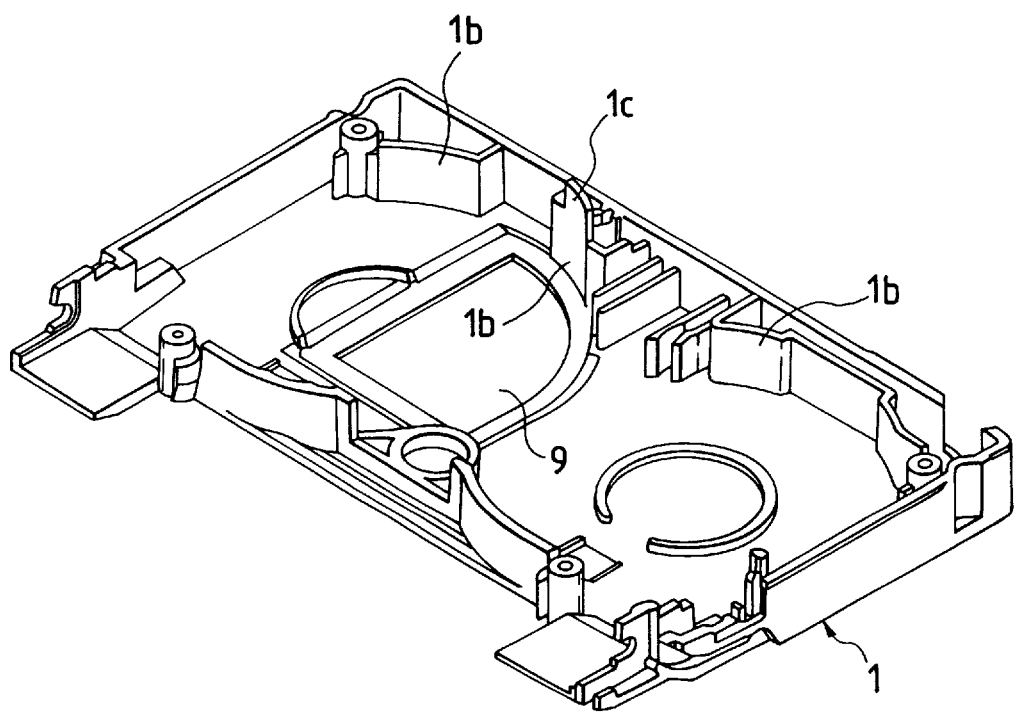
FIG. 3 is a perspective view showing an interior of the upper case more particularly.

FIG. 3 is a perspective view showing more particularly an interior of the upper case 1. Inside the upper case 1 at positions corresponding to the partition walls 2b of the lower case 2, are provided partition walls 1b for defining the areas for the tape reels 3. In one of the partition walls 1b of the upper case 1 at a position corresponding to the cut-out 2d in the partition wall 2b of the lower case 2, is provided a projection 1c which is of a shape engageable with the cut-out 2d. When the upper case 1 is covered over the lower case 2 to be connected with each other, the partition walls 1b of the upper case 1 and the partition walls 2b of the lower case 2 are so arranged as to confront with each other. On this occasion, the projection 1c of the partition wall 1b of the upper case 1 enters into the cut-out 2d of the partition wall 2b of the lower case 2, thereby to close the cut-out 2d. Therefore, even though the cut-out 2d is formed in the partition wall 2b of the lower case 2, there will remain no gap in the case body between the partition walls 2b and 1b after the case body has been assembled.

Figure 4A:
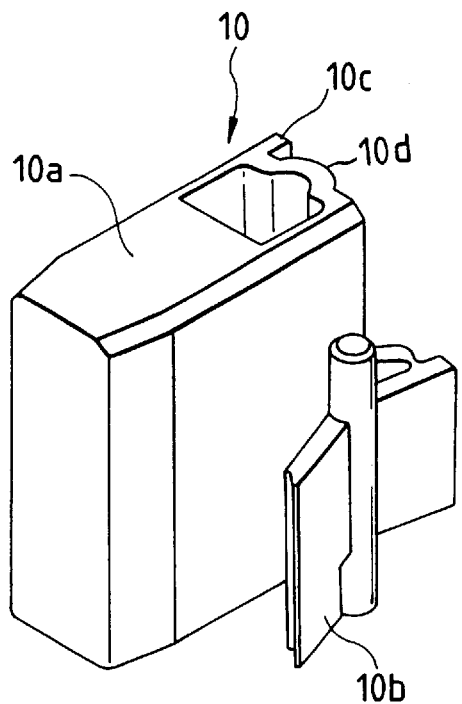
FIG. 4A is a perspective front view showing a reel brake.
Figure 4B:
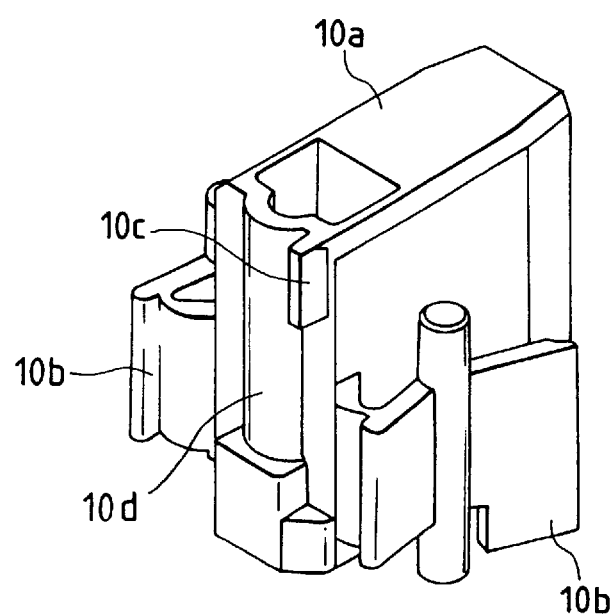
FIG. 4B is a perspective rear view of the reel brake.
Figure 5:
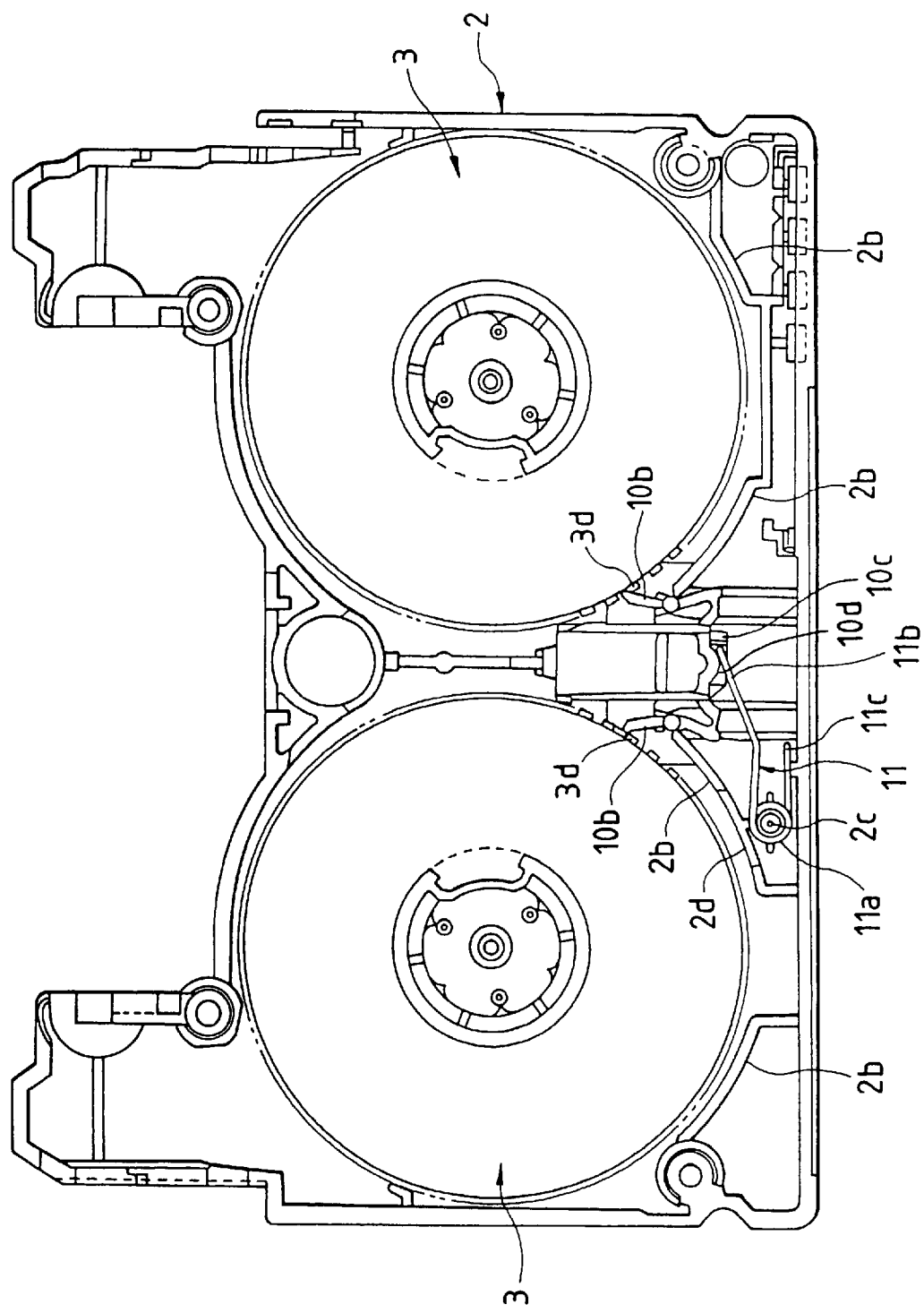
FIG. 5 is a plan view showing the interior of the lower case in which the reel brake and the spring, etc. are arranged.

FIGS. 4A and 4B are perspective views showing the reel brake 10 more particularly, which show a front view and a rear view respectively. At both left and right sides of a main body 10a of the reel brake 10, a pair of hooks 10b for engaging with the teeth 3d of the tape reels 3 are formed in a swinging manner. On a back face of the main body 10a is provided a protrusion 10c in a form of a projection at its upper corner zone. When the reel brake 10 and the spring 11 are disposed inside the lower case 2 as shown in FIG. 5, an arm (one of the arms) 11b of the spring 11 abuts against a projected portion 10d on the back face of the main body 10a of the reel brake 10 and the reel brake 10 is biased toward the tape reel 3 by means of a spring force of the spring 11.

In this situation, when a vibration is applied while the tape cassette is being assembled, or when a shock by dropping etc. is exerted while the reel brake 10 is sliding or after it has been assembled, the arm 11b of the spring 11 moves upward along the back face of the reel brake 10. However, when an end of the arm 11b abuts against the protrusion 10c on the back face of the reel brake 10, a further movement of the arm 11b will be restricted, and thus the arm 11b and the back face of the main body 10a of the reel brake 10 will be kept in an abutted state. Accordingly, this can prevent the spring 11 from disengaging from the reel brake 10.

The support portion 2c fitted with the winding portion 11a of the spring 11 is blocked at its upper end when the upper case 1 is covered. Therefore, the winding portion 11a will not be removed from the support portion 2c even if they receive the shock or the like after assembled. An arm (the other arm) 11c of the spring 11 abuts on an inner face of a side wall of the lower case 2. Because the arm 11c is relatively short, it will be of no problem that the arm 11c moves to be disengaged from the side wall.

Further, such a construction may be conceived that the main body 10a of the reel brake 10 is formed with a groove at the back face which will receive the arm 11b of the spring 11. However, such construction is difficult to realize with the small-sized tape cassette such as the DVC. On the other hand, with the construction according to the invention where the arm 11b of the spring 11 simply abuts on the back face of the main body 10a of the reel brake 10, it will be easy to assemble the spring 11.

According to the invention, the interference between the tool or the like of the automatic assembling machine and the partition wall can be avoided when the biasing member is incorporated in the lower case. This will prevent assembling errors or damages of the partition walls even in the small-sized tape cassette, and enhance an assembling facility. It also enables the tape reels to be securely partitioned in the case body by means of the partition walls.

Further, the reel brake and one of the arms of the helical torsion coil spring can be prevented from being out of engagement while the helical torsion coil spring is mounted or after it has been assembled. This will improve the assembling facility and also assure a normal operation of the reel brake.

What is claimed is:

1. A tape cassette comprising:

a case body including an upper case and a lower case each having a plurality of partition walls configured to rotatably receive tape reels wound with a tape-shaped medium;

a reel brake configured to engage with the tape reels to prevent a free rotation when the tape cassette is not in use and configured to slide between a locked position and an unlocked position of said tape reels;

a biasing member configured to urge said reel brake toward said tape reels; and a support portion for supporting said biasing member provided outside said partition walls of said lower case;

wherein one of said partition walls of the lower case has a cut-out portion adjacent to said support portion, and one of said partition walls of said upper case has a projected portion configured to engage with said cut-out portion of said lower case when said upper case and said lower case are connected.

2. A tape cassette comprising:

a case body including an upper case and a lower case and configured to rotatably contain tape reels wound with a tape-shaped medium;

a reel brake configured to engage with the tape reels to prevent a free rotation when the tape cassette is not in use and configured to slide between a locked position and an unlocked position of said tape reels; and a helical torsion coil spring positioned to urge said reel brake toward the tape reels and having a plurality of arms;

wherein said helical torsion coil spring is inserted into a support shaft in said lower case, one of the arms abutting against said reel brake and other one of the arms abutting against said lower case, said reel brake has a projected portion configured to slidably abut along said one of the arms and a protrusion configured to prevent disengagement of said one of the arms.

\* \* \* \* \*